(No Model.)

W. H. BARNES.
FAUCET.

No. 549,305.

Patented Nov. 5, 1895.

WITNESSES:
E. B. Bolton
E. A. Scott.

INVENTOR
William H. Barnes
BY

ATTORNEYS

UNITED STATES PATENT OFFICE.

WILLIAM H. BARNES, OF TUCSON, ARIZONA TERRITORY.

FAUCET.

SPECIFICATION forming part of Letters Patent No. 549,305, dated November 5, 1895.

Application filed May 9, 1895. Serial No. 548,702. (No model.)

*To all whom it may concern:*

Be it known that I, WILLIAM H. BARNES, a citizen of the United States, residing at Tucson, county of Pima, Territory of Arizona, have invented certain new and useful Improvements in Faucets, of which the following is a full, clear, and exact description.

This invention relates to faucets or spigots; and its object is to provide a faucet simple in construction, which can be readily affixed to a can, tank, or bottle without previous preparation, and this without any danger of leakage from imperfect joints.

The invention will be described in detail with reference to the accompanying drawings, in which—

Figure 1:
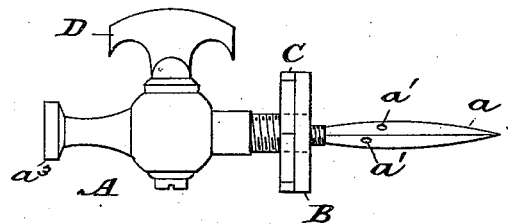
Figure 2:
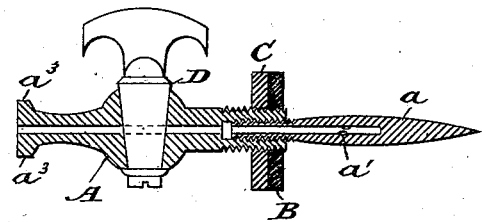
Figure 3:
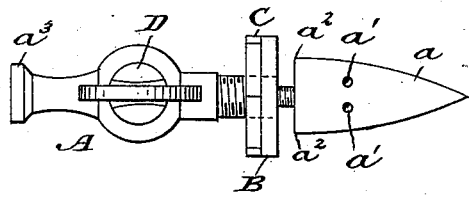
Figure 3:
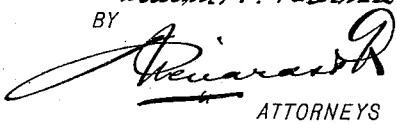

Figure 1 is a perspective view of my invention, and Figs. 2 and 3 are respectively a sectional and a plan view of the same.

Referring to the drawings by letter, A represents a faucet of any convenient size or shape provided with a spear-shaped extension $a$, the latter being hollowed out inside and provided with inlet-holes $a'$.

D represents the plug of the faucet, and C is a nut threaded to the faucet between the plug and the extension $a$, the nut being moved toward and away from the said extension by turning on the screw-thread.

B is a washer of any suitable size or shape.

The spear-shaped extension $a$ is flattened in cross-section and is sharpened at its end. It also has projecting shoulders $a^2$ at its base, the purpose of which will more fully hereinafter appear. The extension $a$ is so joined to the faucet that the flattened side of the spearhead will be substantially at right angles to the plug D.

When the faucet is to be applied to a can or tank from which it is desired to draw the liquid, the point of the spear-shaped extension is placed upon any convenient part of the can or tank, the plug of the faucet being held at right angles to the position in which it is to be finally fixed. The faucet is then hammered or driven into the tank or can until the spear-head is entirely in. It is then twisted or turned so that the two shoulders $a^2$ of the spear-head will pass over the fracture in the tank and washer B is pushed up against the tank on the outside, after which nut C is screwed down tightly against the washer, holding the faucet firmly in place and preventing any leakage from the tank at any point near the juncture of the faucet and the tank or can.

To draw the liquid from the tank, the faucet is opened by plug D and the liquid runs out through the inlet-holes $a'$ in the spear-head $a$ through the hollow in said spear-head and thence through the faucet.

Although the invention above described is designed principally for use on tin cans or tanks and has been described above, having such use particularly in view, it is obvious that the invention may be applied to a tank of any material by merely varying the length of the spear-head or the material of which the faucet is made.

In order that the nozzle of the faucet may not be damaged by heavy blows in applying the faucet to a tank, the nozzle may be reinforced, as at $a^3$, in any suitable manner.

It is obvious that the extension $a$ may be of any suitable shape, instead of being spear-shaped. For instance, if the tank were made of wood it might be desirable to make the extension the same shape as the point of an ordinary nail.

When it is desired to use my improved faucet for bottles, the extension $a$ may be made narrower and smaller, so that it may be readily driven through the cork in the bottle. When so used, its application and operation is as hereinbefore described, and when the washer and nut are screwed down tightly upon the cork the bottle may be hermetically sealed and the contents withdrawn at will, either all at once or a portion at a time.

Having thus described my invention, what I claim as new, and desire to secure by Letters Patent, is—

In combination with the faucet having a tubular end provided with an interior and exterior screw thread, a spear shaped extension having shoulders and a threaded end removably engaging said interior screw thread of the faucet, and a nut threaded to engage said exterior screw thread, substantially as described.

In witness whereof I have hereunto set my hand in presence of two witnesses.

WILLIAM H. BARNES.

Witnesses:
OSCAR BUCKALEW,
JOHN H. MARTIN.